UNITED STATES PATENT OFFICE 2,518,321

ALLYL, VINYL ETHERS OF POLYHYDRIC ALCOHOLS

Fred W. Hoover, Wilmington, Del., assignor to E. I. du Pont de Nemours & Company, Wilmington, Del., a corporation of Delaware No Drawing. Application June 16, 1948, Serial No. 33,447

4 Claims. (Cl. 260—615)

This invention relates to new compositions of matter and more particularly to new unsaturated ethers of polyhydric alcohols.

This invention has as an object a new type of unsaturated ether possessing a combination of properties which are of particular value in the production of high quality coating compositions. Further objects reside in methods for making these ethers. Other objects will appear hereinafter.

The products of this invention are ethers of polyhydric alcohols which have from two to six carbon atoms and in which one of the hydroxyl hydrogens is replaced by the vinyl group, $CH_2=CH-$, and the remaining hydroxyl hydrogens are replaced by 2-alkenyl groups, i. e., groups of the formula

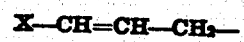

$$X-CH=CH-CH_2-$$

where X is hydrogen or an aliphatic hydrocarbon radical.

The new ethers described herein can be either monomeric or polymeric. The monomeric ethers, which are identified by the characterization given above, are readily polymerized by contact with a polymerization catalyst. Polymers possessing a combination of properties of particular value in coating compositions are obtained when the previously described alkenyl groups contain from three to four carbon atoms. These polymers comprise the polymerization product of either a single or a plurality of the above described ethers, and also the copolymerization product of one or more of the ethers with any of the known polymerizable unsaturated compounds including other vinyl ethers.

The new ethers described herein which contain both a vinyl and 2-alkenyl groups are prepared by heating at a temperature of from 125° to 200° C. in contact with an alkaline catalyst, an excess of acetylene and polyhydric alcohol ether in which there is one free hydroxyl group and in which the hydrogens of the other hydroxyl groups are replaced with 2-alkenyl radicals. The alkaline catalyst can be any alkali metal or hydroxide of such metal, and are most conveniently the hydroxides of sodium, potassium or lithium. The reaction will take place at any pressure above one atmosphere. The pressure otherwise is not critical and is limited only from the standpoint of safety hazards and of mechanical difficulties that occur at about 30 atmospheres and above. Pressures of 150 to 250 lbs. per square inch are quite suitable. The heating is continued until etherification of the free hydroxyl group is substantially complete, periods of time ranging from 15 to 25 hrs. generally being sufficient for this. The resulting vinyl 2-alkenyl ether of the polyhydric alcohol is isolated and purified by conventional methods, for example, by fractional distillation.

The monomeric ethers obtained by the above procedure are conveniently polymerized in solution in an organic solvent in contact with a small amount of a polymerization catalyst which is preferably of the acidic ionic type. Specific examples of catalysts of this kind, which are used in amounts ranging from 0.05 to 5% and preferably from 0.1 to 1% of the weight of the monomer or comonomer mixture, are ferric chloride, stannic chloride, aluminum chloride, boron trifluoride, perchloric and sulfuric acids. The solvents can be hydrocarbons, alcohols or ethers, examples of which are xylene, benzene, butyl alcohol, dibutyl ether, dioxane and the dimethyl ether of ethylene glycol. Ethers are the preferred solvents for the polymerization of those vinyl 2-alkenyl ethers which are difficult to polymerize without crosslinking, i. e., ethers of polyhydric alcohols having three or more hydroxyl groups. As soon as the monomer solution is contacted with the catalyst polymerization takes place with the evolution of heat. Under preferred conditions the catalyst is added portionwise, allowing the heat of polymerization to subside before adding additional portions; the mixture is finally heated at temperatures of 80° to 100° C. to ensure complete polymerization. Viscous liquid polymers suitable for coating compositions are usually obtained in from 10 to 30 minutes under these conditions.

This invention is illustrated further by the following examples in which the proportions of ingredients are expressed in parts by weight unless otherwise specified.

Example I

This example illustrates the preparation of a di-2-alkenyl monovinyl ether of glycerol.

A mixture of 525 parts of glycerol 1,3-diallyl ether and 10.5 parts of solid potassium hydroxide is heated at 150° C. under an acetylene pressure of 180–240 lb./sq. in. for 22 hours. The reaction mixture is then flash distilled, after which the crude product is redistilled through an efficient fractionating column, whereupon 475.6 parts of glycerol 1,3-diallyl 2-vinyl ether,

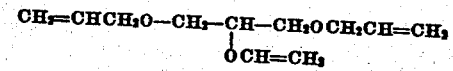

having a boiling point of 73° C. at 1.1 mm., and a refractive index, $n_D^{25}$, of 1.4509, is obtained. Analysis: Hydrogenation number (grams of hydrogen absorbed per gram of compound) calculated: 0.031. Hydrogenation number found: 0.030, 0.033. Infrared absorption measurements showed the substantial absence of hydroxyl groups in this product.

The addition of about 0.67 part of a catalyst solution consisting of 2% ferric chloride hexahydrate in ethylene glycol dimethyl ether to a solution of 23.8 parts of the glycerol 1,3-diallyl 2-vinyl ether of the above example in 23.3 parts of ethylene glycol dimethyl ether initiates the polymerization of the unsaturated ether. This polymerization takes place with the evolution of heat which causes the reaction mixture to increase in temperature to about 73° C. in 15 minutes. After the addition of another 0.53 part of catalyst solution, the reaction mixture is heated on a steam bath for 15 minutes to complete the polymerization. The solvent is removed by distillation leaving 23.7 parts of a viscous oily polymer. A solution of this polymer dissolved in an equal weight of xylene and containing 0.05%, based on weight of polymer, cobalt in the form of cobalt naphthenate as a drier, is flowed on a sanded autobody steel panel, and a smooth clear coating is obtained. After 12 hours in the air the coating dries to a tack-free film which is insoluble in xylene and has good color and gloss. After further air-drying for 20 days the coating has a pencil hardness of 4H.

An air-drying copolymer of the unsaturated ether of the above example with isobutyl vinyl ether is prepared in a manner similar to that described in the preceding paragraph from a mixture of 16 parts of glycerol 1,3-diallyl 2-vinyl ether and 4 parts of isobutyl vinyl ether. This copolymer is a viscous, amber colored oil, and a 50% xylene solution of it containing 0.05% cobalt, as cobalt naphthenate, flowed on sanded autobody steel panels dries tack-free in 18 hours. These coatings possess a pencil hardness of 4H after air-drying 20 days, and they possess good color, gloss and xylene resistance.

Another air-drying copolymer similar to that described in the preceding paragraph, except that it contains a higher proportion of isobutyl vinyl ether, is prepared in the same way from a mixture of 12 parts of glycerol 1,3-diallyl 2-vinyl ether and 8 parts of vinyl isobutyl ether in 20 parts of ethylene glycol dimethyl ether. The product obtained after removal of the solvent under reduced pressure is a very viscous oily liquid. A 50% xylene solution of this polymer containing 0.05% cobalt, as cobalt naphthenate, flowed on sanded autobody steel panels dries tack-free in 24 hours. After air-drying for 20 days the coating has a pencil hardness of H, and is more flexible than those described in the preceding paragraphs.

*Example II*

This example illustrates the preparation of a 2-alkenyl vinyl ether of ethylene glycol.

A mixture of 301 parts of the monoallyl ether of ethylene glycol and 9.5 parts of 85% potassium hydroxide is heated at 150° C. for 18½ hours in an autoclave under an acetylene pressure of 250 lb./sq. in. The crude reaction mixture is submitted to a preliminary distillation to separate the volatile material from the solid and non-volatile tars, which amount to 45.6 parts. The redistillation of the crude distillate through an efficient fractionating column yields 265 parts of ethylene glycol allyl vinyl ether, $$CH_2=CHCH_2OCH_2CH_2OCH=CH_2$$

boiling at 70° C. at 48 mm. and having a refractive index, $n_D^{25}$, of 1.4332. Analysis: calculated for $C_7H_{12}O_2$: C 65.6%, H 9.4%. Found C 65.35% 65.21%; H 9.52%, 9.52%.

A polymeric ethylene glycol allyl vinyl ether is obtained from the product of the above example in a manner similar to that described previously for the polymerization of the product of Example I. The addition of 0.27 part of a 5% solution of ferric chloride hexahydrate in diethyl ether to a mixture of 20 parts of ethylene glycol allyl vinyl ether and 17.4 parts of xylene causes the temperature of the mixture to rise to 45° C. during 10 minutes. The addition of another 0.27 part of catalyst solution causes the temperature of the reaction mixture to rise to 55° C. during another 15 minutes. The addition of a further 0.27 part of catalyst solution causes no further temperature rise, thus indicating polymerization is complete. The resulting solution is viscous, and when 0.05% of cobalt, as cobalt naphthenate and based on the weight of the polymer solids is incorporated, it can be used directly as a coating composition. Coatings flowed from this solution on autobody steel panels dry tack-free in about 10 hours at ordinary temperature, and utimately set up to hard, glossy, colorless coatings which are insoluble in xylene.

The addition of 0.8 part of a 2% solution of ferric chloride hexahydrate in ethylene glycol dimethyl ether to a mixture of 21 parts of the ethylene glycol allyl vinyl ether of Example II and 9 parts of isobutyl vinyl ether in 30 parts of ethylene glycol dimethyl ether causes the temperature of the mixture to rise to 95° C. during 10 minutes. After the addition of another 0.27 part of catalyst solution, the reaction mixture is heated on a steam bath at 85-90° C. for 18 minutes. Removal of the solvent from the reaction mixture by evaporation leaves 28.5 parts of a viscous polymer. A 50% xylene solution of this polymer containing 0.5% cobalt, as cobalt naphthenate and based on the polymer content of the solution, can be flowed on sanded autobody steel panels to give coatings which dry to a tack-free condition in about 15 hours. After 20 days' air-drying these coatings have a pencil hardness of H, are moderately inert, and have good gloss, color and flexibility.

*Example III*

This example illustrates the preparation of a 2-alkenyl vinyl ether of diethylene glycol.

A mixture of 550 parts of the monoallyl ether of diethylene glycol and 11 parts of 85% potassium hydroxide is heated at 150° C. for about 21 hours under an acetylene pressure of 220-250 lb./sq. in. The crude reaction mixture is subjected to a preliminary distillation to isolate the volatile products. The distillate is then redistilled through an efficient fractionating column and 560 parts (86% yield) of diethylene glycol allyl vinyl ether, $$CH_2=CHCH_2OCH_2CH_2OCH_2CH_2OCH=CH_2$$

is obtained. This ether has a boiling point of 65° C. at 2 mm. and a refractive index, $n_D^{25}$, of 1.4433. Analysis: Hydrogenation number calculated 0.023. Hydrogenation number found 0.023.

A polymer of diethylene glycol allyl vinyl ether is obtained by adding 067 part of a 2% solution of ferric chloride hexahydrate in ethylene glycol dimethyl ether to a solution of 25 parts of the diethylene glycol allyl vinyl ether of Example III in 50 parts of ethylene glycol dimethyl ether. In 10 minutes the temperature of the mixture rises to the boiling point, whereupon another 0.13 part of catalyst solution is added and the mixture heated on the steam bath for 15 minutes. The solvent is removed from the reaction mixture by evaporation, whereupon a viscous oil is obtained. A 50% solution of this oil is xylene with 0.05% cobalt (as cobalt naphthenate) flowed on autobody steel panels air-dries to a tack-free film in about 9 hours at ordinary temperature. After further air-drying, the coating has good color, gloss, xylene resistance, and flexibility.

Monovinyl 2-alkenyl ethers of polyhydric alcohols, other than those mentioned in the examples, include ethers of polyhydric alcohols having 2 to 6 carbon atoms such as, for example, triethylene glycol, 1,3-propanediol, 1,2-butanediol, 2,3-butanediol, 1,4-butanediol, 2-methyl-1,3-propanediol, pentaerythritol, mannitol, sorbitol, 1,6-hexanediol, and quinitol in which alcohols one hydroxyl hydrogen is replaced by vinyl and the other hydroxyl hydrogens are replaced by 2-alkenyl groups such as, for example, allyl, methallyl, crotyl and methylvinyl carbinyl. Particular monovinyl 2-alkenyl ethers of this kind are 1,4-butanediol methallyl vinyl ether, glycerol 2,3-dicrotyl-1-vinyl ether, 1,6-hexanediol methylvinyl-carbinyl vinyl ether, triethylene glycol methallyl vinyl ether, 2,3-butanediol methylvinyl carbinyl vinyl ether, and sorbitol pentacrotyl vinyl ether.

The starting materials from which the foregoing ethers are derived, namely, polyhydric alcohols having a nucleus of 2 to 6 carbon atoms which have one free hydroxyl and in which the hydrogens of the remaining hydroxyls are replaced by 2-alkenyl radicals, can be made by conventional methods such as the following: Glycerol 1,3-diallyl ether is readily obtained from epichlorohydrin and allyl alcohol. The monoallyl ethers of ethylene glycol and the polyethylene gycols are readily obtained from ethylene oxide and allyl alcohol. The monoallyl ether of 1,4-butanediol can be prepared from 1,4-butanediol and allyl chloride. In general, the alcohol ethers are best made by etherifying the corresponding alcohol with the desired 2-alkenyl halide using potassium hydroxide or other bases as acid acceptors.

The polymers of the monovinyl 2-alkenyl ethers of polyhydric alcohols of this invention possess the valuable characteristic of air-drying. The resulting air-dried polymers possess a good balance of properties, such as hardness, flexibility, solvent resistance, etc. which makes them attractive for use in coating compositions. In the case of copolymers the proportions of the different comonomers can be varied over a wide range. The final properties of the polymers of this invention, and in particular the film properties, can be controlled by varying the types and proportions of the copolymer ingredients. For use as drying oils in coating composition, copolymers of the monovinyl 2-alkenyl ethers of polyhydric alcohols with vinyl ethers of saturated aliphatic alcohols of from 1 to 18 carbon atoms are especially suitable. In this particular application copolymers containing up to 75% of the vinyl alkyl ether component just mentioned are useful; however, polymers containing from 0-50% of this component are generally preferred. In general, the presence of the vinyl alkyl ether component decreases the drying rate of the polymers of vinyl 2-alkenyl ethers of polyhydric alcohols, and also gives softer and more flexible products.

As indicated above, the vinyl 2-alkenyl ethers of polyhydric alcohols are of particular value for the formation of polymers which have outstanding air-drying characteristics. However, the monomeric ethers are also of value as intermediates for other chemical reaction, for example, for reaction with various materials which add to olefinic double bonds, such as alcohols and acids.

As many apparently widely different embodiments of this invention may be made without departing from the spirit and scope thereof, it is to be understood that this invention is not limited to the specific embodiments thereof except as defined in the appended claims.

I claim:

1. An ether of a polyhydric alcohol of from 2 to 6 carbon atoms in which one hydroxyl hydrogen atom of said alcohol is replaced by the vinyl group and in which the remaining hydroxyl hydrogen atoms are replaced by 2-alkenyl groups.
2. Glycerol 1,3-diallyl 2-vinyl ether.
3. Ethylene glycol allyl vinyl ether.
4. Diethylene glycol allyl vinyl ether.

FRED W. HOOVER.

REFERENCES CITED

The following references are of record in the file of this patent:

UNITED STATES PATENTS

| Number | Name | Date |
| --- | --- | --- |
| 1,959,927 | Reppe | May 22, 1934 |
| 2,097,590 | Dreyfus | Nov. 2, 1937 |
| 2,157,348 | Reppe | May 9, 1939 |
| 2,201,074 | Britton | May 14, 1940 |
| 2,450,234 | Evans | Sept. 28, 1948 |

Certificate of Correction

Patent No. 2,518,321 August 8, 1950

FRED W. HOOVER

It is hereby certified that error appears in the printed specification of the above numbered patent requiring correction as follows:

Column 3, lines 18 and 19, for "minuates" read *minutes*; column 4, line 75, for "067 part" read *0.67 part*; column 5, line 11, for the words "oil is" read *oil in*; and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*